Patented May 2, 1939

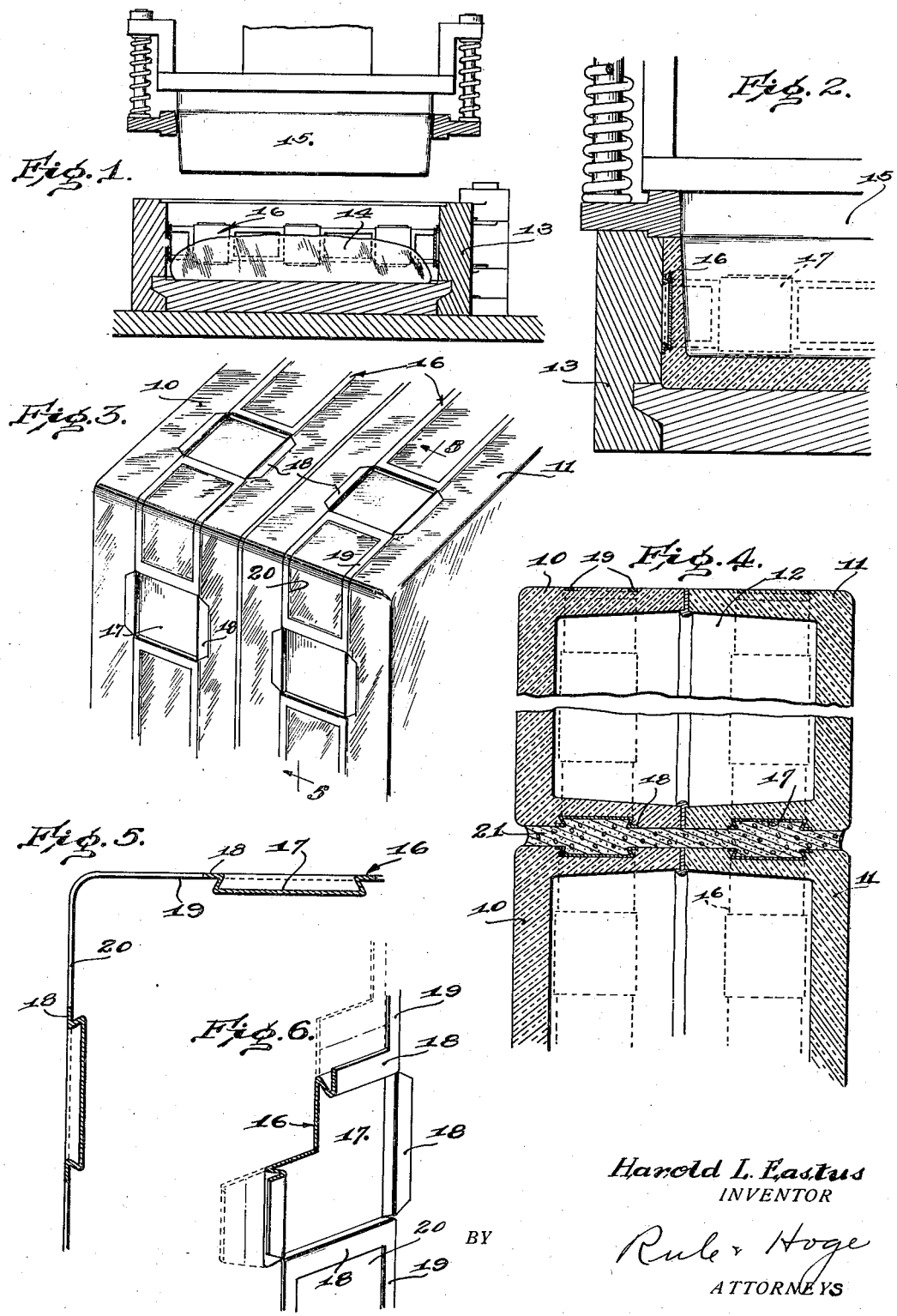

2,156,623

UNITED STATES PATENT OFFICE 2,156,623

GLASS BUILDING BLOCK

Harold L. Eastus, Muncie, Ind., assignor to Owens-Illinois Glass Company, a corporation of Ohio Application June 29, 1937, Serial No. 150,976

8 Claims. (Cl. 72—42)

The present invention relates to building blocks and more particularly to hollow sectional glass building blocks which may be employed for building purposes.

The principal object of the invention is to provide a hollow glass building block which, when embodied in a masonry structure, will offer maximum efficiency at the mortar joints by greatly increasing the shearing strength between the block and the mortar.

Another object of the invention is to provide such a building block in which the tendency of the block to "float" in green mortar while being laid is decreased, thus making it possible to "point up" the joints between adjacent blocks with greater ease and rapidity than has heretofore been possible with glass building blocks.

Other objects of the invention will become apparent as the description of the invention ensues.

In the accompanying drawing:

Fig. 1 is a fragmentary sectional elevational view, somewhat diagrammatic in its representation, taken vertically through a mold and forming plunger prior to descent of the latter upon the mold charge and illustrating the manner in which one of the sections of the improved building block is formed;

Fig. 2 is an enlarged fragmentary sectional view of the mold and forming plunger after the latter has descended upon the mold charge to form the block section;

Fig. 3 is a fragmentary perspective view of one corner of an assembled building block manufactured in accordance with the principles of the present invention;

Fig. 4 is a fragmentary vertical sectional view taken through a portion of a masonry structure in which the improved glass blocks are employed;

Fig. 5 is a sectional view taken through a metal insert employed in connection with the invention and is a view taken substantially along the plane 5—5 of Fig. 4; and Fig. 6 is a fragmentary perspective view, partly in section, of the insert shown in Fig. 3.

Referring to Figs. 3 and 4, the improved block structure comprises a pair of substantially rectangular cup-shaped block sections 10 and 11 which are joined together at their meeting edges by a suitable bonding material, for example, aluminum, thus providing a hollow space or chamber 12 within the block.

The block sections 10 and 11 are substantially identical in formation and each is formed in an open mold 13 from a mold charge 14 (Fig. 1) of molten glass by the pressing action of a plunger 15 which descends into the mold 13 and causes outward and upward flow of the molten glass around the plunger 15 as illustrated in Fig. 2.

A metal insert 16 is embedded in the side faces of the block, i. e., the faces which are designed for joining in the mortar or cement joint of the masonry construction, the insert 16 taking the form of a rectangular open frame-like structure formed from a flat sheet metal blank (shown in dotted lines in Fig. 6) which is stamped and bent into the form indicated in Figs. 5 and 6.

The metal insert 16 is embedded in the side faces of each of the block sections 10 and 11 by the expedient of placing the same in the mold 13 prior to the forming operation and consists of a series of spaced open shallow and substantially rectangular box-like divisions 17 which are of dove-tail cross-section both vertically and horizontally with the open sides thereof being presented outwardly.

The metal of the insert 16 surrounding the open side of each box-like division is turned outwardly to provide a plurality of surface flanges 18 which surround the open side of the division and which are adapted to lie flush with the surface of the glass on the sides of the block. The divisions 17 are connected together by parallel extending straps 19 which are also adapted to lie flush with the surface of the glass and which are provided by the expedient of punching rectangular openings 20 in the metal of the blank in the regions thereof which lie between the divisions 17.

When the blocks are assembled in a masonry construction, the mortar or cement 21 is pressed into the shallow divisions 17 and assumes the dove-tail shape thereof. Thus, the tendency of the mortar to "float" the blocks or flow outwardly over the block edges, is reduced to a minimum inasmuch as the green mortar is not only fairly viscous but is also plastic and will not flow over an irregular surface with the same ease as over a smooth surface. In other words, the spaced re-entrant dove-tail portions of the mortar which enter the shallow pockets of the divisions 17, form anchor points, the influence of which extends throughout the mortar joint.

It follows that with the use of the improved block comprising the present invention, the mortar of the joint will endure a greater amount of pressure without being forced laterally from between the blocks and hence a greater pressure can be used in placing the blocks in the masonry, adjacent each other. Thus, a greater density in the mortar joint will be secured, for mortar that has been hard pressed between the ends of the blocks unites with more perfect adhesion because of the better contact and of more air being pressed out.

Since the ends of the block are smooth, being formed of glass, during the "pointing up" of the joint when a trowel is run therealong, there is a pressure inwardly on the mortar which ordinarily would result in occasional loosening of the adhesion between the mortar and the block while the mortar is green. The adhesion, once loosened, can never be entirely restored and when the adhesion has been so loosened, no proper bond can be attained and the joint will not be a waterproof one.

With the improved block having the insert 16 associated therewith, pressure of the trowel during the "pointing up" operation will not loosen the joint because of the presence of the anchor points, above referred to, which are distributed throughout the joint and which prevent lateral floating or shifting of the blocks.

Modifications may be resorted to within the scope of the appended claims.

I claim:

1. A glass block of substantially rectangular formation having at least one side thereof designed for union in a mortar joint, said side being provided with a pocket therein into which mortar is adapted to be forced when compressed between adjacent blocks in a masonry construction.

2. A glass block of substantially rectangular formation having at least one side thereof designed for union in a mortar joint, said side being provided with a pocket therein into which mortar is adapted to be forced when compressed between adjacent blocks in a masonry construction, the side walls of said pocket being inclined outwardly toward each other.

3. A glass block of substantially rectangular formation having a side thereof designed for union in a mortar joint, said side being provided with a shallow substantially rectangular recess therein into which mortar is adapted to be forced when compressed between adjacent blocks in a masonry construction, the opposed pairs of side walls of said recess being inclined outwardly toward each other.

4. A hollow sectional glass block comprising adjacent cup-shaped half-sections secured together at their rims, the sides of each section each being provided with a shallow pocket therein into which mortar is adapted to be forced when compressed between adjacent blocks in a masonry construction.

5. A glass block of substantially rectangular formation having adjacent sides thereof designed for union in a mortar joint, and a metal insert extending completely around said block and embedded in the glass of said sides, said insert having portions thereof underlying the glass of said sides to prevent dislodgement thereof.

6. A glass block of substantially rectangular formation having adjacent sides thereof designed for union in a mortar joint, and a metal insert extending completely around said block and embedded in the glass of said sides, said insert being provided with pockets into which mortar is adapted to be forced when compressed between adjacent blocks in a masonry construction.

7. A glass block having adjacent sides thereof designed for union in a mortar joint, and a metal insert in the form of a band extending completely around said block and embedded in the glass of said sides, said band comprising spaced divisions providing pockets into which mortar is adapted to be forced when compressed between adjacent blocks in a masonry construction, said divisions being connected together by narrow strips, the outer surfaces of said divisions and strips occupying a position flush with the surfaces of said sides.

8. A metal insert adapted to be embedded in the side faces of a hollow glass building block comprising an open rectangular frame-like sheet metal structure including a plurality of substantially rectangular spaced shallow box-like divisions having open sides presented outwardly, said divisions being connected together by parallel straps.

HAROLD L. EASTUS.